(12) United States Patent
Pome et al.

(10) Patent No.: US 12,291,340 B2
(45) Date of Patent: May 6, 2025

(54) PROPULSION UNIT WITH PROPELLER AND ELECTRIC MOTOR COMPRISING AN ADAPTED PRIMARY STRUCTURE, AND AIRCRAFT HAVING AT LEAST ONE SUCH PROPULSION UNIT

(71) Applicants: Airbus Operations SAS, Toulouse (FR); Airbus SAS, Blagnac (FR)

(72) Inventors: Pascal Pome, Toulouse (FR); Nicolas Jolivet, Toulouse (FR); Rémi Amargier, Toulouse (FR); Lionel Czapla, Toulouse (FR); Franck Alvarez, Toulouse (FR); Kotaro Fukasaku, Toulouse (FR); Benoît Penven, Toulouse (FR); Delphine Jalbert, Blagnac (FR); Laurent Lafont, Blagnac (FR); Milan Tasic, Toulouse (FR); Frédéric Goupil, Toulouse (FR); Jean-Victor Lapeyre, Marignane (FR); Emmanuel Mermoz, Marignane (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 266 days.

(21) Appl. No.: 17/849,895

(22) Filed: Jun. 27, 2022

(65) Prior Publication Data
US 2022/0411084 A1  Dec. 29, 2022

(30) Foreign Application Priority Data
Jun. 29, 2021 (FR) ...................................... 2106993

(51) Int. Cl.
*B64D 27/40* (2024.01)
*B64D 27/30* (2024.01)

(52) U.S. Cl.
CPC ............ *B64D 27/40* (2024.01); *B64D 27/30* (2024.01); *B64D 27/402* (2024.01)

(58) Field of Classification Search
CPC ...... B64D 27/30; B64D 27/40; B64D 27/404; B64D 27/406
See application file for complete search history.

(56) References Cited

U.S. PATENT DOCUMENTS 9,919,804 B2 * 3/2018 Pautis ..................... B64D 27/18
10,144,524 B2 * 12/2018 Binks ..................... B64D 27/40
(Continued)

FOREIGN PATENT DOCUMENTS

| EP | 1571081 A1 | 9/2005 |
| EP | 3757012 A1 | 12/2020 |
| FR | 2916736 A1 | 12/2008 |

OTHER PUBLICATIONS

French Search Report; priority document.

*Primary Examiner* — Philip J Bonzell
*Assistant Examiner* — Anna L. Gordon
(74) *Attorney, Agent, or Firm* — Greer, Burns & Crain, Ltd.

(57) ABSTRACT

A propulsion unit, and an aircraft, with a propeller and electric motor, including at least one intermediate element interposed between the electric motor and the propeller and configured to transmit at least thrust loads generated by the propeller, a primary structure supporting the propulsion unit, at least one interface having: a first load path, configured to transmit loads perpendicular to the axis of rotation of the propeller, linking the at least one intermediate element to a support linked rigidly to or incorporated in the primary structure, a second load path, configured to transmit loads that are parallel to the axis of rotation of the propeller, (Continued)

linking the at least one intermediate element to a support linked rigidly to or incorporated in the primary structure.

16 Claims, 6 Drawing Sheets

(56) References Cited

U.S. PATENT DOCUMENTS

| | | |
|---|---|---|
| 2005/0194493 A1 | 9/2005 | Marche |
| 2010/0127117 A1* | 5/2010 | Combes ................ B64D 27/40 244/54 |
| 2010/0176239 A1 | 7/2010 | Marche |
| 2013/0240666 A1* | 9/2013 | Schnelz ................ B64D 27/40 244/54 |
| 2017/0313431 A1* | 11/2017 | Florent ..................... F02K 3/06 |
| 2018/0044001 A1* | 2/2018 | Dauphin ............... B64C 25/505 |
| 2018/0230845 A1* | 8/2018 | Joshi ......................... F02C 7/36 |
| 2020/0049026 A1* | 2/2020 | Hughes .................. F01D 15/10 |

* cited by examiner

PROPULSION UNIT WITH PROPELLER AND ELECTRIC MOTOR COMPRISING AN ADAPTED PRIMARY STRUCTURE, AND AIRCRAFT HAVING AT LEAST ONE SUCH PROPULSION UNIT

CROSS-REFERENCES TO RELATED APPLICATIONS

This application claims the benefit of the French patent application No. 2106993 filed on Jun. 29, 2021, the entire disclosures of which are incorporated herein by way of reference.

FIELD OF THE INVENTION

The present application relates to a propulsion unit with a propeller and electric motor comprising an adapted primary structure, and to an aircraft having at least one such propulsion unit.

BACKGROUND OF THE INVENTION

According to an embodiment that can be seen in FIG. 1, an aircraft 10 comprises a fuselage 12, at least one wing 14 linked to the fuselage 12, and propulsion units 16 linked to the wing 14 and arranged on either side of the fuselage 12.

As illustrated in FIG. 2, each propulsion unit 16 comprises a motor 18, a propeller 20 having an axis of rotation A20, a gearbox 22 linking the motor 18 and the propeller 20, and a primary structure 24 linking the motor 18 and the gearbox 22 to the wing 14.

For the remainder of the description, a longitudinal direction X is parallel to the axis of rotation A20 of the propeller 20. A longitudinal plane contains the axis of rotation A20. A transverse plane is perpendicular to the longitudinal direction X. A horizontal transverse direction Y is perpendicular to the longitudinal direction X and oriented horizontally. A vertical transverse direction Z is perpendicular to the longitudinal direction X and oriented vertically. The concepts "front" and "rear" refer to the direction of flow of the air with respect to the aircraft in flight, the air flowing from the front to the rear.

In the case of a combustion engine or a turbomachine, the motor 18 comprises a structural body able to transmit loads, such as the thrust loads generated by the propeller 20, for example.

According to one embodiment, the primary structure 24 comprises a front frame 26 linked by multiple interfaces positioned in a first plane transverse to a front area of the motor 18, and a rear frame 28 linked by multiple interfaces positioned in a second plane transverse to a rear area of the motor 18.

The front and rear frames 26, 28 and also the first and second transverse planes are spaced apart as far as possible to optimally react thrust loads of the propeller 20 that are oriented in the longitudinal direction X, the longitudinal torque Mx of the propeller 20, and also loads oriented in the horizontal and vertical transverse directions Y and Z.

This embodiment, which is suitable for combustion engines or turbomachines, is not suitable for electric motors which do not have a body capable of transmitting loads, such as the thrust loads generated by the propeller 20, for example.

SUMMARY OF THE INVENTION

The present invention seeks to remedy all or some of the drawbacks of the prior art.

To that end, the invention relates to a propulsion unit comprising at least one electric motor, a propeller exhibiting an axis of rotation, at least one intermediate element interposed between the motor and the propeller and configured to transmit at least thrust loads generated by the propeller, and a primary structure supporting the propulsion unit.

According to the invention, the propulsion unit comprises at least one interface having a first load path, configured to transmit essentially loads that are perpendicular to the axis of rotation of the propeller, linking the intermediate element or one of the intermediate elements to a support linked rigidly to or incorporated in the primary structure, and a second load path, configured to transmit essentially loads that are parallel to the axis of rotation of the propeller, linking the intermediate element or one of the intermediate elements to a support linked rigidly to or incorporated in the primary structure.

Since the interface is not linked to the motor, the primary structure is suitable for a propulsion unit with an electric motor. Moreover, providing two load paths makes it possible to optimize each of them for the loads it transmits.

According to another feature, the second load path comprises at least two connecting rods which converge on the axis of rotation of the propeller and each of which forms an angle of between 20° and 70° with the axis of rotation of the propeller.

According to another feature, the connecting rods are positioned symmetrically with respect to a vertical plane passing through the axis of rotation of the propeller.

According to another feature, the first path comprises multiple attachments, each having a pivoting connection exhibiting a pivot axis oriented parallel to the axis of rotation of the propeller.

According to another feature, each attachment comprises:
a clevis integral with a first element from among the support and the intermediate element,
a cylindrical rod supported by the clevis and oriented parallel to the axis of rotation of the propeller,
a body integral with a second element from among the support and the intermediate element, different than the first element, having a cylindrical recess which exhibits a diameter greater than that of the cylindrical rod and an axis parallel to the axis of rotation of the propeller,
a sleeve made of elastic material interposed between the recess in the body and the cylindrical rod supported by the clevis.

According to another feature, the attachments are positioned symmetrically with respect to a vertical plane passing through the axis of rotation of the propeller.

According to another feature, each attachment is positioned in the same longitudinal plane as a connecting rod.

According to another feature, the interface comprises a first support positioned in a first transverse plane, multiple attachments linking the first support and the intermediate element and positioned approximately in the first transverse plane or close to it, a second support positioned in a second transverse plane offset toward the rear with respect to the first transverse plane, an extension integral with the intermediate element extending in a direction approximately parallel to the axis of rotation of the propeller, toward the rear with respect to the intermediate element, the extension being linked to the second support by a connection.

According to another feature, the connection linking the second support and the extension has a finger integral with the extension and oriented in a direction parallel to the axis of rotation of the propeller, and also a recess integral with the second support and configured to receive the finger, the recess and the finger having approximately the same diameter.

According to another feature, the interface comprises a support, at least three flexible attachments which link the support and the intermediate element and are positioned in a first transverse plane, and also at least three connecting rods having a first end linked to the support by a first connection and a second end linked to the intermediate element by a second connection positioned in a second transverse plane, spaced apart from the first transverse plane and offset toward the front with respect to this first transverse plane.

According to another feature, the interface comprises a first support positioned in a first transverse plane, multiple attachments which link the first support and the intermediate element and are positioned approximately in the first transverse plane or close to it, a second support positioned in a second transverse plane, and also multiple connecting rods each having a first end linked to the second support by a first connection and a second end linked to the intermediate element by a second connection positioned in a third transverse plane, spaced apart from the second transverse plane and offset toward the front with respect to this second transverse plane.

According to another feature, each first or second connection is a pivoting connection exhibiting a pivot axis positioned in a transverse plane that is perpendicular to the axis of rotation of the propeller, the pivot axes of the first and second connections of each connecting rod being parallel to one another.

According to another embodiment, the first load path comprises an extension integral with the intermediate element extending in a direction approximately parallel to the axis of rotation of the propeller, toward the rear with respect to the intermediate element, the extension being linked by a connection to the support to which the connecting rods are linked.

According to another feature, the connection linking the support and the extension has a finger integral with the extension and oriented in a direction parallel to the axis of rotation of the propeller and also a recess integral with the support and configured to receive the finger, the recess and the finger having approximately the same diameters.

The invention also relates to an aircraft comprising at least one propulsion unit according to one of the above features.

BRIEF DESCRIPTION OF THE DRAWINGS

Other features and advantages will become apparent from the following description of the invention, which description is given solely by way of example, with reference to the appended drawings in which.

DETAILED DESCRIPTION OF THE PREFERRED EMBODIMENTS

Figure 1:
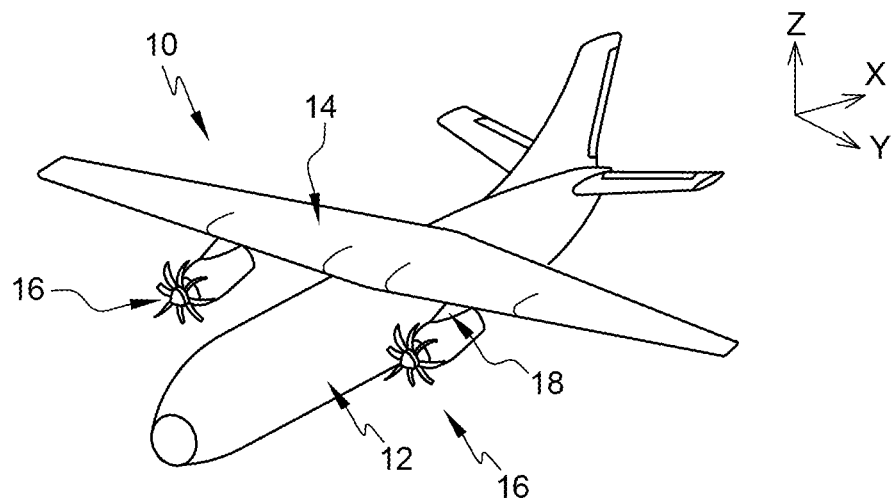
FIG. 1 is a schematic perspective representation of an aircraft, illustrating one embodiment.
Figure 2:
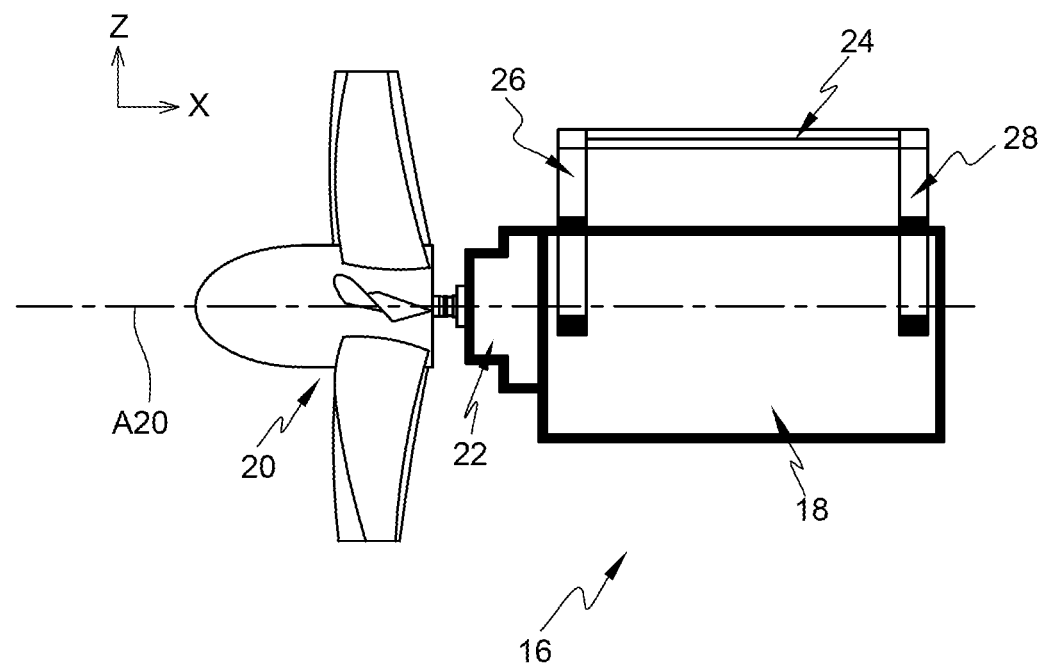
FIG. 2 is a schematic side representation of a propulsion unit, illustrating an embodiment of the prior art.
Figure 3:
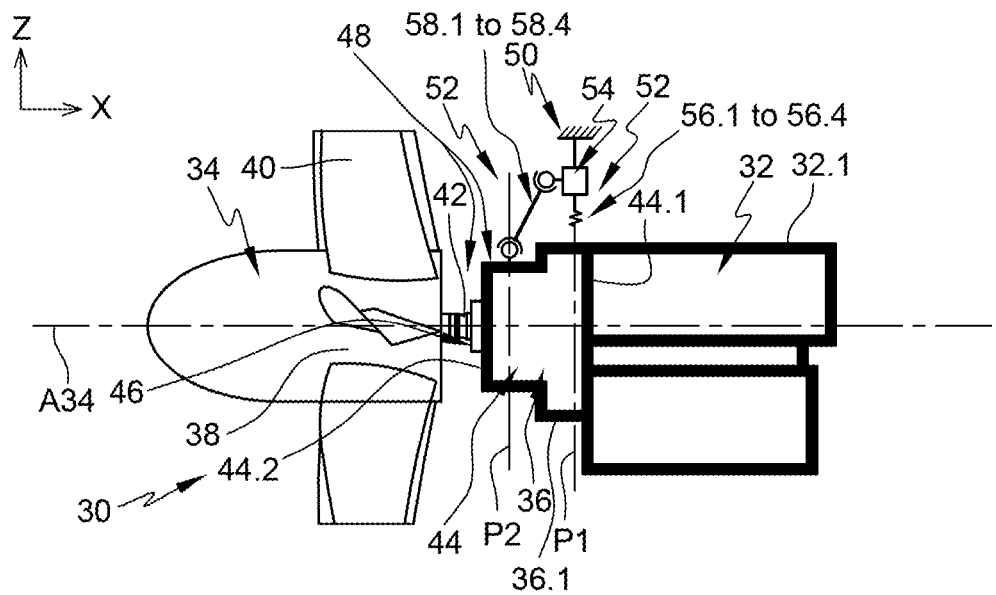
FIG. 3 is a schematic side representation of a propulsion unit, illustrating a first embodiment of the invention.
Figure 4:
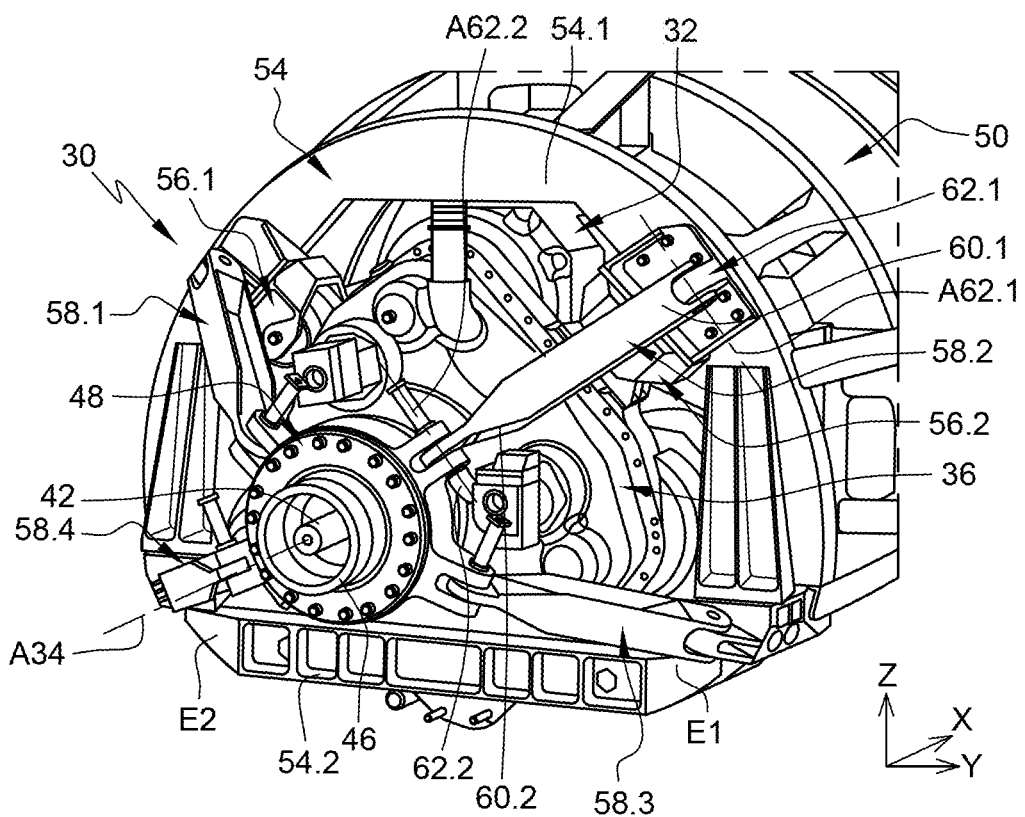
FIG. 4 is a perspective view of a propulsion unit, illustrating the first embodiment of the invention.
Figure 5:
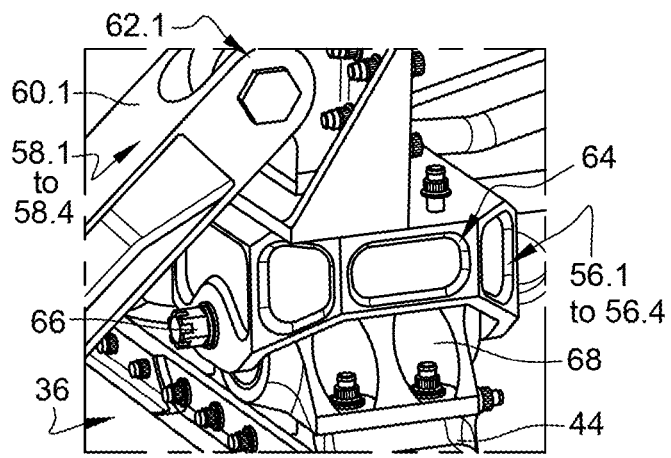
FIG. 5 is a perspective view of an attachment linking a primary structure and a gearbox, illustrating the first embodiment of the invention.
Figure 6:
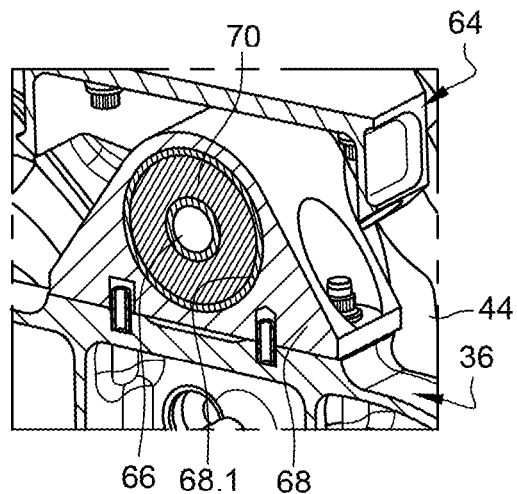
FIG. 6 is a cross section through the attachment that can be seen in FIG. 5.

According to embodiments that can be seen in FIGS. 3, 4, 7, 8, 10 and 12, a propulsion unit 30 of an aircraft comprises at least one motor 32, a propeller 34 exhibiting an axis of rotation A34, and a gearbox 36 linking the motor 32 and the propeller 34.

According to one configuration, the propeller 34 comprises a hub 38 and also multiple blades 40 supported by the hub 38.

The propulsion unit 30 comprises a first shaft 42 linking the gearbox 36 and the hub 38 of the propeller 34.

The motor 32 is an electric motor. According to one configuration, the propulsion unit 30 comprises multiple electric motors.

Each motor 32 comprises at least one carcass 32.1 forming an outer envelope. According to one configuration, this carcass 32.1 is not able to transmit loads, such as thrust loads generated by the propeller 34, for example.

The gearbox 36 comprises a housing 44 forming an outer envelope. According to one configuration, the housing 44 of the gearbox 36 is configured to transmit loads, such as thrust loads generated by the propeller 34, for example. Of course, the invention is not restricted to this embodiment. Thus, it would be possible for the housing 44 not to be able to transmit the thrust loads.

The housing 44 comprises a rear face 44.1, positioned approximately in a transverse plane, to which is attached and fixed at least one motor 32, a front face 44.2 through which the first shaft 42 passes, and at least one side face linking the rear and front faces 44.1, 44.2.

According to one configuration, the propulsion unit 30 comprises a guiding system 46 for guiding the first shaft 42 configured to transmit loads, such as the thrust loads, for example.

Irrespective of the embodiment, the propulsion unit 30 comprises at least one intermediate element 48 from among the gearbox 36 and the guiding system 46, interposed between the motor 32 and the propeller 34, configured to transmit at least thrust loads generated by the propeller 34.

The propulsion unit 30 comprises at least one structure, referred to below as primary structure 50, linking the propulsion unit 30 to the wing of the aircraft, and a secondary structure forming an aerodynamic envelope surrounding the propulsion unit 30.

Figure 9:
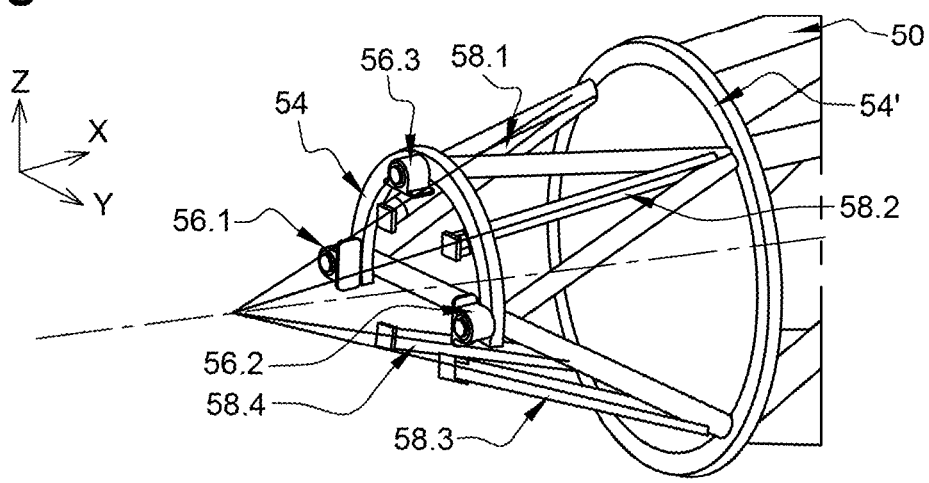
FIG. 9 is a perspective view of a primary structure, illustrating the second embodiment of the invention.
Figure 11:
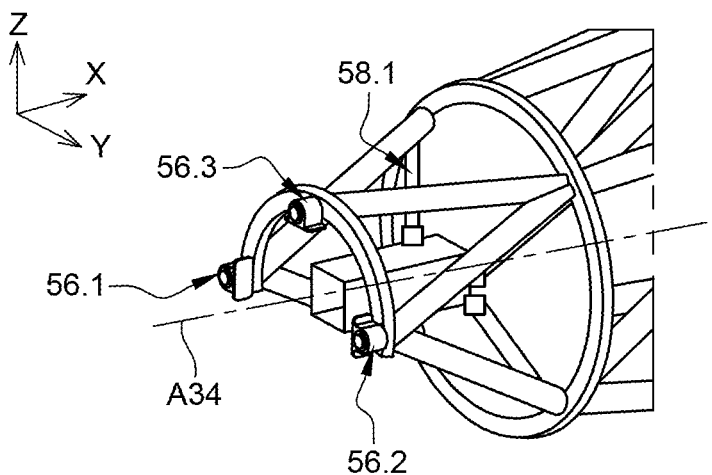
FIG. 11 is a perspective view of a primary structure, illustrating the third embodiment of the invention.
Figure 13:
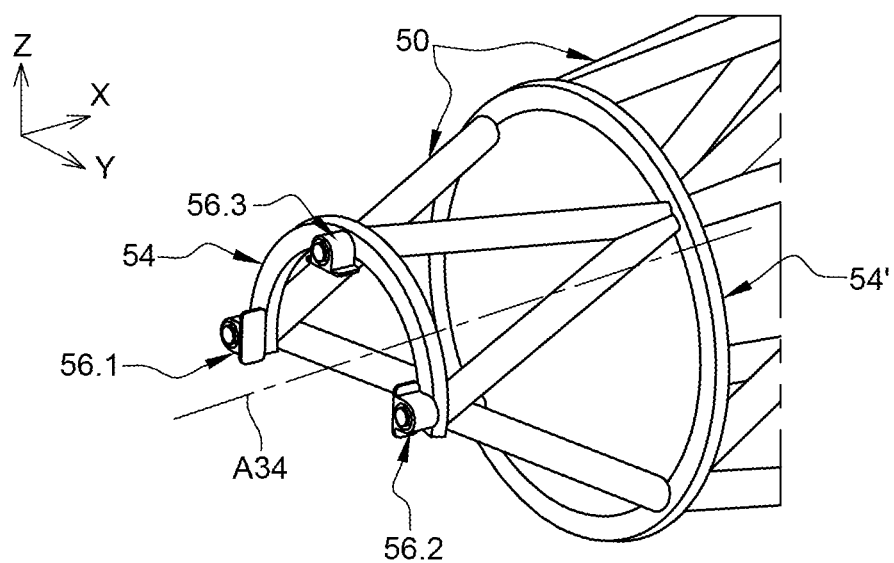
FIG. 13 is a perspective view of a primary structure, illustrating the fourth embodiment of the invention.

According to the embodiments, the primary structure 50 may comprise a box-type structure, a grid-type structure, as illustrated in FIGS. 9, 11 and 13, or any other structure. Irrespective of the embodiment, the primary structure 50 is configured to transmit loads between the propulsion unit 30 and the wing of the aircraft.

The primary structure 50 comprises at least one interface 52 linking it to at least one intermediate element 48, and at least one wing attachment linking it to the wing of the aircraft.

According to a first embodiment that can be seen in FIGS. 3 to 6, the interface 52 comprises a support 54 linked rigidly to or incorporated in the primary structure 50, at least three flexible attachments 56.1 to 56.3 which link the support 54 and the gearbox 36, more particularly its housing 44, and are positioned in a first transverse plane P1, and also at least three connecting rods 58.1 to 58.3 oriented in directions which converge on the axis of rotation A34 of the propeller 34. Each connecting rod 58.1 to 58.3 has a first end 60.1 linked to the support 54 by a first connection 62.1 and a second end 60.2 linked to the gearbox 36, more particularly to its housing 44, by a second connection 62.2 positioned in a second transverse plane P2, spaced apart from the first transverse plane P1 and offset toward the front with respect to this first transverse plane P1. According to one configuration, the interface 52 comprises four flexible attachments 56.1 to 56.4 and four connecting rods 58.1 to 58.4.

The flexible attachments 56.1 to 56.4 are positioned symmetrically with respect to a vertical longitudinal plane. According to one configuration, the flexible attachments 56.1 to 56.4 are evenly distributed around the axis of rotation A34 of the propeller 34. The connecting rods 58.1 to 58.4 are positioned symmetrically with respect to a vertical longitudinal plane. According to one configuration, the connecting rods 58.1 to 58.4 are evenly distributed around the axis of rotation A34 of the propeller 34.

According to one arrangement, each flexible attachment 56.1 to 56.4 is positioned in the same longitudinal plane as a connecting rod 58.1 to 58.4.

According to one configuration, the first transverse plane P1 is positioned close to the rear face 44.1 of the housing 44 and the second transverse plane P2 is positioned close to the front face 44.2 of the housing 44. As a variant, the second end 60.2 of each connecting rod 58.1 to 58.4 is linked to the guiding system 46.

Each flexible attachment 56.1 to 56.4 comprises a clevis 64 integral with a first element from among the support 54 and the gearbox 36, a cylindrical rod 66 supported by the clevis 64, integral with the latter and oriented parallel to the longitudinal direction X, and a body 68 integral with a second element from among the support 54 and the gearbox 36, different than the first element, having a cylindrical recess 68.1 which exhibits a diameter greater than that of the cylindrical rod 66 and an axis oriented parallel to the longitudinal direction X. The clevis 64, the cylindrical rod 66 and the body 68 are made of rigid material, such as metal, for example.

Each flexible attachment 56.1 to 56.4 likewise comprises a sleeve 70 made of elastic material, such as rubber or elastomer, for example, interposed between the recess 68.1 of the body 68 and the cylindrical rod 66 supported by the clevis 64. This sleeve 70 exhibits an outside diameter approximately equal to that of the recess 68.1 of the body 68 and an inside diameter approximately equal to that of the cylindrical rod 66. According to one arrangement, the sleeve 70 is force fitted over the cylindrical rod 66 and/or in the recess 68.1 of the body 68. During operation, the sleeve 70 exhibits an axis oriented parallel to the longitudinal direction X.

Given the orientation of the sleeve 70, it transfers loads in horizontal and vertical transverse directions Y and Z. Due to its ability to elastically deform, the sleeve 70 makes it possible to filter out vibrations and to limit their propagation between the gearbox 36 and the primary structure 50.

According to one arrangement, each connecting rod 58.1 to 58.4 forms an angle of between 20° and 70° with the axis of rotation A34 of the propeller 34.

According to a first variant, each first connection 62.1 is a pivoting connection exhibiting a pivot axis A62.1 positioned in a transverse plane. In parallel, each second connection 62.2 is a pivoting connection exhibiting a pivot axis A62.2 positioned in a transverse plane, the pivot axes A62.1, A62.2 of the first and second connections of one and the same connecting rod 58.1 to 58.4 being parallel to one another.

According to another variant, each of the first and second connections 62.1, 62.2 is a ball-jointed connection.

According to one configuration, the support 54 surrounds the gearbox 36 and comprises a first part 54.1 in the form of an arc of a circle, and a second rectilinear part 54.2 linking the ends E1, E2 of the first part 54.1.

Of course, the invention is not restricted to this configuration for the support 54.

According to this first embodiment, the connecting rods 58.1 to 58.4 react thrust loads generated by the propeller 34 that are oriented parallel to the longitudinal direction X and moments oriented in the horizontal and vertical transverse directions Y and Z. In addition, the flexible attachments 56.1 to 56.4 react the torque generated by the propeller 34 and loads oriented in the horizontal and vertical transverse directions Y and Z.

Figure 7:
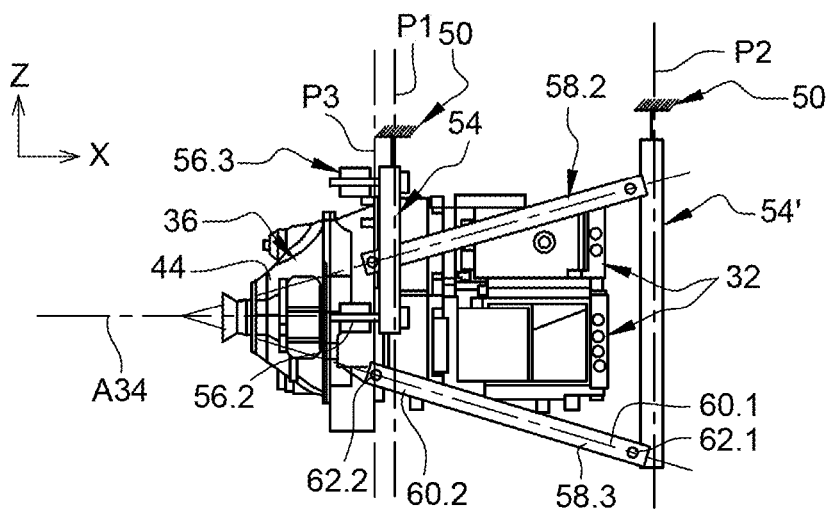
FIG. 7 is a schematic side representation of a propulsion unit, illustrating a second embodiment of the invention.
Figure 8:
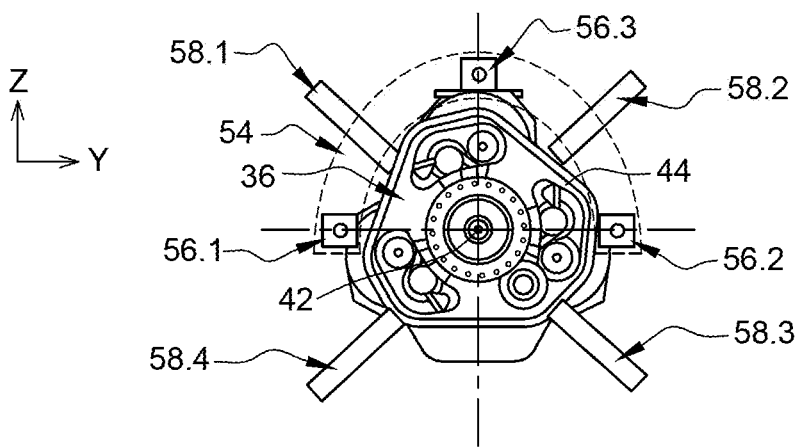
FIG. 8 is a schematic front representation illustrating the second embodiment of the invention.

According to a second embodiment that can be seen in FIGS. 7 to 9, the interface 52 comprises a first support 54, positioned in a first transverse plane P1, linked rigidly to or incorporated in the primary structure 50, multiple attachments 56.1 to 56.3 which link the first support 54 and the gearbox 36, more particularly its housing 44, and are positioned approximately in the first transverse plane P1 or close to it, a second support 54', positioned in a second transverse plane P2, linked rigidly to or incorporated in the primary structure 50, and also multiple connecting rods 58.1 to 58.4 oriented in directions which converge on the axis of rotation A34 of the propeller 34. Each connecting rod 58.1 to 58.4 has a first end 60.1 linked to the second support 54' by a first connection 62.1 and a second end 60.2 linked to the gearbox 36, more particularly to its housing 44, by a second connection 62.2 positioned in a third transverse plane P3, spaced apart from the second transverse plane P2 in the longitudinal direction X and offset toward the front with respect to this second transverse plane P2. The second support 54' is offset toward the rear with respect to the first support 54.

According to one configuration, the interface 52 comprises three attachments 56.1 to 56.3, first and second attachments 56.1 and 56.2 positioned in the horizontal longitudinal plane on either side of the axis of rotation A34 of the propeller 34 and also a third attachment 56.3 positioned in the vertical longitudinal plane. In addition, the interface 52 comprises four connecting rods 58.1 to 58.4 positioned around the axis of rotation A34 of the propeller 34 symmetrically with respect to the vertical longitudinal plane, at 45°, 135°, 225° and 315°.

Like for the first embodiment, each connecting rod 58.1 to 58.4 forms an angle of between 20° and 70° with the axis of rotation A34 of the propeller 34.

According to a first variant, the attachments 56.1 to 56.3 are flexible attachments, as illustrated in the first embodiment. According to a second variant, the attachments 56.1 to 56.3 are not flexible and do not comprise any flexible sleeve. According to one configuration, each attachment 56.1 to 56.3 comprises a pivoting connection exhibiting a pivot axis oriented parallel to the longitudinal direction X.

Like for the first embodiment, for each connecting rod 58.1 to 58.4, the first connection 62.1 is a pivoting connection exhibiting a pivot axis A62.1 positioned in a transverse plane. In parallel, each second connection 62.2 is a pivoting connection exhibiting a pivot axis A62.2 positioned in a transverse plane, the pivot axes A62.1, A62.2 of the first and second connections of one and the same connecting rod 58.1 to 58.4 being parallel to one another.

According to another configuration, each of the first and second connections 62.1, 62.2 is a ball-jointed connection.

The first and second supports 54, 54' are each ring-shaped or in the form of an arc of a circle.

Figure 10:
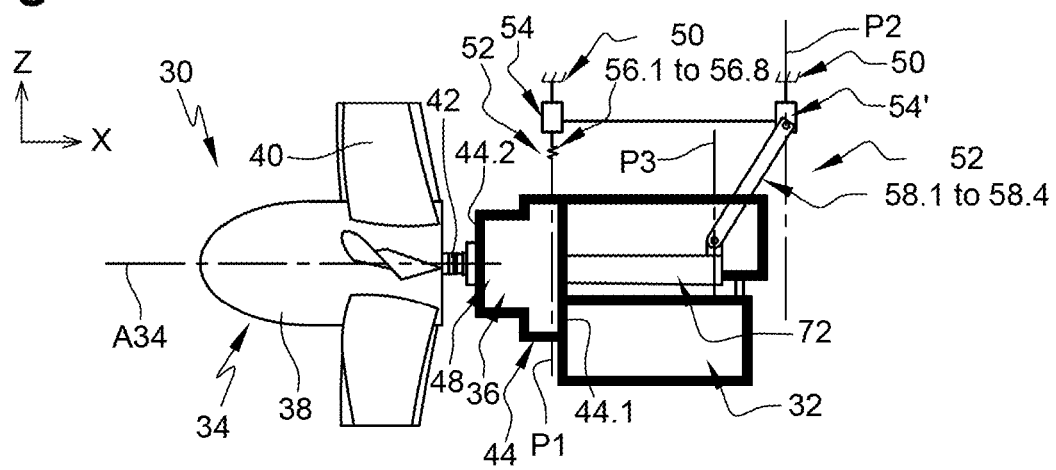
FIG. 10 is a schematic side representation of a propulsion unit, illustrating a third embodiment of the invention.

According to a third embodiment that can be seen in FIGS. 10 and 11, the interface 52 comprises an extension 72 integral with the gearbox 36, more particularly with its housing 44, which protrudes from the rear face 44.1 of the housing 44 and extends in a direction approximately parallel to the longitudinal direction X, toward the rear with respect to the gearbox 36.

According to this third embodiment, each second end 60.2 of the connecting rods 58.1 to 58.4 is linked by a second connection 62.2 to the extension 72, the second connections 62.2 being positioned in a third transverse plane P3, spaced apart from the second transverse plane P2 of the second support 54'.

According to one embodiment, the extension 72 comprises a hollow tube.

Like for the first and second embodiments, each connecting rod 58.1 to 58.4 forms an angle of between 20° and 70° with the axis of rotation A34 of the propeller 34.

According to these second and third embodiments, the connecting rods 58.1 to 58.4 react thrust loads oriented parallel to the longitudinal direction X and moments oriented in the horizontal and vertical transverse directions Y and Z. In addition, the attachments 56.1 to 56.4 react the torque generated by the propeller and loads oriented in the horizontal and vertical transverse directions Y and Z.

Figure 12:
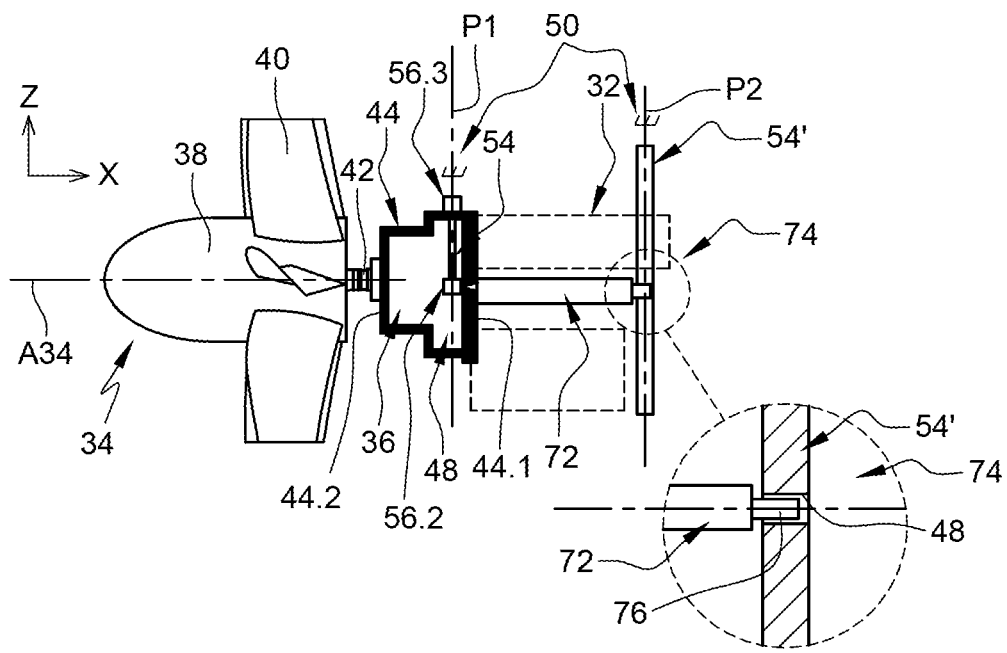
FIG. 12 is a schematic side representation of a propulsion unit, illustrating a fourth embodiment of the invention.

According to a fourth embodiment that can be seen in FIGS. 12 and 13, the interface 52 comprises a first support 54, positioned in a first transverse plane P1, multiple attachments 56.1 to 56.3 that link the first support 54 and the gearbox 36, more particularly its housing 44, and are positioned approximately in the first transverse plane P1 or close to it, a second support 54', positioned in a second transverse plane P2 offset toward the rear with respect to the first transverse plane P1, an extension 72 integral with the gearbox 36, more particularly with its housing 44, which protrudes from the rear face 44.1 of the housing 44 and extends in a direction approximately parallel to the longitudinal direction X, toward the rear with respect to the gearbox 36, and at least one connection 74 linking the extension 72 and the second support 54'.

According to a configuration that can be seen in FIG. 13, the first support 54 is a half-ring positioned in the first transverse plane P1 and the second support 54' is a ring or a disk positioned in the second plane P2.

Like for the third embodiment, the extension 72 is a hollow tube.

According to one arrangement, the interface 52 comprises three attachments 56.1 to 56.3, first and second attachments 56.1 and 56.2 positioned in the horizontal longitudinal plane on either side of the axis of rotation A34 of the propeller 34 and also a third attachment 56.3 positioned in the vertical longitudinal plane.

According to a first variant, the attachments 56.1 to 56.3 are flexible attachments, as illustrated in the first embodiment. According to a second variant, the attachments 56.1 to 56.3 are not flexible and are configured to react thrust loads that are parallel to the longitudinal direction X, the torque of the propeller 34, and the inertial loads oriented in the horizontal and vertical transverse directions Y and Z. By way of example, the attachments 56.1 to 56.3 may be ball-jointed connections or non-sliding, pivot connections.

The connection(s) 74 linking the extension 72 and the second support 54' react(s) loads oriented in a transverse plane. According to a first configuration, the connection 74 comprises two reinforcements each having a first end linked to the second support 54' and a second end linked to the extension 72. These reinforcements are positioned in a transverse plane, a first reinforcement forming an angle of about 45° with the vertical and transverse direction Z, a second reinforcement forming an angle of −45° with the vertical and transverse direction Z.

According to a second configuration that can be seen in FIG. 12, the connection 74 comprises a finger 76, which is integral with the extension 72 and continues it and is oriented in the longitudinal direction X, and a recess 78 integral with the second support 54' and configured to receive the finger 76, the recess 78 and the finger 76 having approximately the same diameter.

Figure 14:
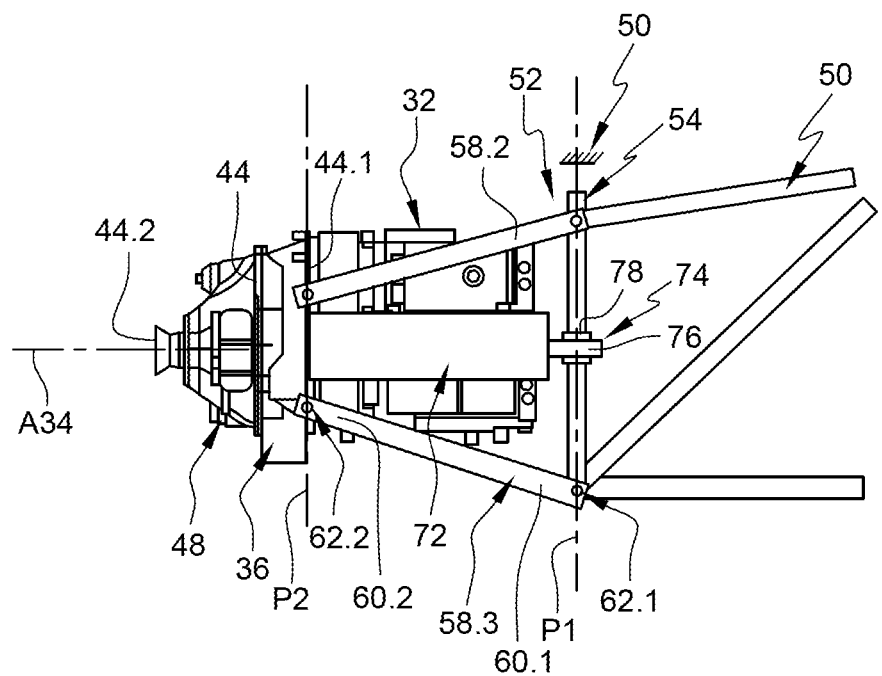
FIG. 14 is a schematic side representation of a propulsion unit, illustrating a fifth embodiment.
Figure 15:
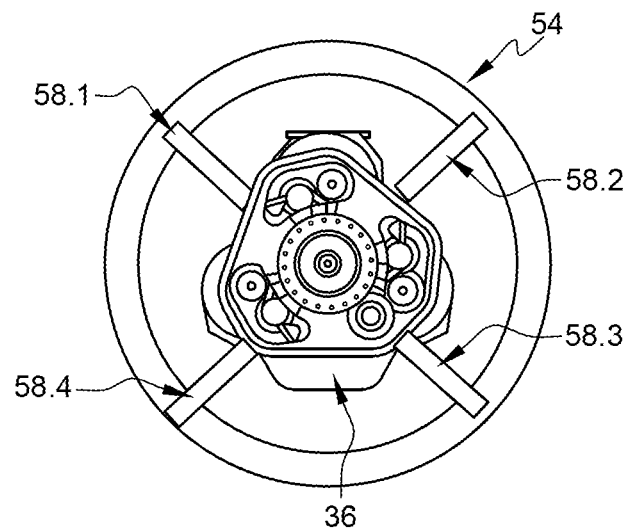
FIG. 15 is a schematic front representation illustrating the fifth embodiment.

According to a fifth embodiment that can be seen in FIGS. 14 and 15, the interface 52 comprises a support 54, which is positioned in a first transverse plane P1 and linked rigidly to or incorporated in the primary structure 50, and multiple connecting rods 58.1 to 58.4 oriented in directions which converge on the axis of rotation A34 of the propeller 34. Each connecting rod 58.1 to 58.4 has a first end 60.1 linked to the support 54 by a first connection 62.1 and a second end 60.2 linked to the gearbox 36, more particularly to its housing 44, by a second connection 62.2 positioned in a second transverse plane P2, spaced apart from the first transverse plane P1 in the longitudinal direction X and offset toward the front with respect to this first transverse plane P1. By way of example, the first and second connections 62.1, 62.2 are ball-jointed connections.

According to one configuration, the interface 52 comprises four connecting rods 58.1 to 58.4 positioned around the axis of rotation A34 of the propeller 34 symmetrically with respect to the vertical longitudinal plane at 45°, 135°, 225° and 315°, the angle values being given by way of example and being able to be chosen in ranges of plus or minus 15° around the values.

Like for the first embodiment, each connecting rod 58.1 to 58.4 forms an angle of between 20° and 70° with the axis of rotation A34 of the propeller 34.

According to this fifth embodiment, the interface 52 comprises an extension 72 integral with the gearbox 36, more particularly with its housing 44, which protrudes from the rear face 44.1 of the housing 44 and extends in a direction approximately parallel to the longitudinal direction X, toward the rear with respect to the gearbox 36, and at least one connection 74 linking the extension 72 and the support 54.

According to one configuration, the connection 74 comprises a finger 76, which is integral with the extension 72 and continues it and is oriented in the longitudinal direction X, and a recess 78 integral with the support 54 and configured to receive the finger 76, the recess 78 and the finger 76 having approximately the same diameters so as to obtain a sliding pivot connection.

According to this fifth embodiment, the extension 72 and the connection 74 link the gearbox 36 and the support 54 and form a first load path configured to transmit essentially loads oriented parallel to a transverse plane. In addition, the connecting rods 58.1 to 58.4 link the gearbox 36 and the support 54 and form a second load path configured to transmit loads oriented parallel to a longitudinal direction X.

Of course, the invention is not restricted to the embodiments described above. Irrespective of the embodiment, the interface 52 comprises a first load path, configured to transmit essentially loads oriented parallel to a transverse plane, linking an intermediate element 48 to a support 54, and a second load path, configured to transmit loads oriented parallel to a longitudinal direction X, linking an intermediate element 48 to a support 54.

According to the invention, the load paths between the propeller 34 and the primary structure 50 do not pass through the motors 32. Moreover, providing two load paths makes it possible to optimize each of them for the loads they transmit.

According to embodiments that can be seen in FIGS. 3 to 11, 14 and 15, the second load path comprises at least two connecting rods 58.1, 58.2 which converge on the axis of rotation A34 of the propeller 34. These connecting rods each form an angle of between 20° and 70° with the axis of rotation A34 of the propeller 34. This arrangement makes it possible to optimize the ability to react thrust loads generated by the propeller 34.

According to another particular feature, the connecting rods are positioned symmetrically with respect to a vertical plane passing through the axis of rotation A34 of the propeller 34. According to one arrangement, the second load path comprises at least three connecting rods, preferably four connecting rods, linked by anchoring points to a frame 54' surrounding the motor, the anchoring points being distributed over the circumference of the frame 54. This arrangement helps to optimize the ability to react thrust loads.

According to some embodiments, the first path comprises multiple attachments 56.1, 56.2 each having a pivoting connection which exhibits a pivot axis oriented parallel to the longitudinal direction X. This configuration makes it possible to optimize the ability to react loads oriented in directions comprising a component parallel to the horizontal transverse direction Y and/or a component parallel to the vertical transverse direction Z.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion unit comprising:
   at least one electric motor,
   a propeller exhibiting an axis of rotation,
   at least one intermediate element interposed between the motor and the propeller and configured to transmit at least thrust loads generated by the propeller, and
   a primary structure supporting the propulsion unit,
   wherein the propulsion unit comprises at least one interface comprising:
      a first load path, configured to transmit loads that act mainly perpendicular to the axis of rotation of the propeller, linking the intermediate element or one of the intermediate elements to a support linked rigidly to or incorporated in the primary structure, and
      a second load path, configured to transmit loads that act mainly parallel to the axis of rotation of the propeller, linking the intermediate element or one of the intermediate elements to the support linked rigidly to or incorporated in the primary structure,
   wherein the second load path comprises at least two connecting rods which converge toward the axis of rotation of the propeller and each of which forms an angle of between 20° and 70° with the axis of rotation of the propeller.

2. The propulsion unit as claimed in claim 1, wherein the at least two connecting rods are positioned symmetrically with respect to a vertical plane passing through the axis of rotation of the propeller.

3. The propulsion unit as claimed in claim 1, wherein the first path comprises multiple attachments each having a pivoting connection exhibiting a pivot axis oriented parallel to the axis of rotation of the propeller.

4. The propulsion unit as claimed in claim 3, wherein each one of the multiple attachments comprises:
   a clevis integral with a first element, where the first element is the support or the intermediate element,
   a cylindrical rod supported by the clevis and oriented parallel to the axis of rotation of the propeller,
   a body integral with a second element, where the second element is the other of the support or the intermediate element, having a cylindrical recess which exhibits a diameter greater than that of the cylindrical rod and an axis parallel to the axis of rotation of the propeller,
   a sleeve made of elastic material interposed between the recess in the body and the cylindrical rod supported by the clevis.

5. The propulsion unit as claimed in claim 3, wherein the multiple attachments are positioned symmetrically with respect to a vertical plane passing through the axis of rotation of the propeller.

6. The propulsion unit as claimed in claim 5, wherein each attachment is positioned in the same longitudinal plane as a connecting rod.

7. The propulsion unit as claimed in claim 1, wherein the interface comprises:
   a first support positioned in a first transverse plane,
   multiple attachments linking the first support and the intermediate element and positioned approximately in the first transverse plane or close to the first transverse plane,
   a second support positioned in a second transverse plane and offset toward the rear with respect to the first transverse plane, and
   an extension integral with the intermediate element extending in a direction approximately parallel to the axis of rotation of the propeller toward the rear with respect to the intermediate element, said extension being linked to the second support by a connection.

8. The propulsion unit as claimed in claim 7, wherein the connection linking the second support and the extension has a finger integral with the extension and oriented in a direction parallel to the axis of rotation of the propeller, and also a recess integral with the second support and configured to receive the finger, the recess and the finger having approximately the same diameter.

9. The propulsion unit as claimed in claim 1, wherein the interface comprises:
   a support,
   at least three flexible attachments which link the support and the intermediate element and are positioned in a first transverse plane perpendicular to the axis of rotation of the propeller, and
   at least three connecting rods having a first end linked to the support by a first connection and a second end linked to the intermediate element by a second connection positioned in a second transverse plane perpendicular to the axis of rotation of the propeller, spaced apart from the first transverse plane and offset toward the front with respect to this first transverse plane.

10. The propulsion unit as claimed in claim 9, wherein each first or second connection is a pivoting connection exhibiting a pivot axis positioned in a transverse plane that is perpendicular to the axis of rotation of the propeller, the pivot axes of the first and second connections of each connecting rod being parallel to one another.

11. The propulsion unit as claimed in claim 1, wherein the interface comprises:
   a first support positioned in a first transverse plane,
   multiple attachments which link the first support and the intermediate element and are positioned approximately in the first transverse plane or close to the first transverse plane,
   a second support positioned in a second transverse plane, and
   multiple connecting rods, each having a first end linked to the second support by a first connection and a second end linked to the intermediate element by a second connection positioned in a third transverse plane, spaced apart from the second transverse plane and offset toward the front with respect to this second transverse plane.

12. The propulsion unit as claimed in claim 1, wherein the first load path comprises an extension, integral with the intermediate element, extending in a direction approximately parallel to the axis of rotation of the propeller toward the rear with respect to the intermediate element, said extension being linked by a connection to the support to which the connecting rods are linked.

13. The propulsion unit as claimed in claim 12, wherein the connection linking the support and the extension has a finger integral with the extension and oriented in a direction parallel to the axis of rotation of the propeller, and a recess integral with the support and configured to receive the finger, the recess and the finger having approximately the same diameter.

14. An aircraft comprising at least one propulsion unit as claimed in claim 1.

15. The propulsion unit as claimed in claim 1, wherein the second load path comprises four rods positioned around the axis of rotation of the propeller, symmetrically with respect to a vertical plane passing through the axis of rotation of the propeller.

16. The propulsion unit as claimed in claim 1, wherein the intermediate element is one of:
   a gearbox linking the motor and the propeller; or
   a guiding system for guiding a first shaft linking a gearbox and the propeller.

* * * * *